United States Patent
Hong et al.

(10) Patent No.: US 11,154,005 B2
(45) Date of Patent: Oct. 26, 2021

(54) LAWN MOWER ROBOT

(71) Applicant: LG ELECTRONICS INC., Seoul (KR)

(72) Inventors: Woo Hong, Seoul (KR); Siyong Kim, Seoul (KR); Hanshin Kim, Seoul (KR); Hyunsup Song, Seoul (KR); Kyeongho Cho, Seoul (KR); Jaehun Han, Seoul (KR); Jiwoo Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 16/375,424

(22) Filed: Apr. 4, 2019

(65) Prior Publication Data

US 2019/0307062 A1      Oct. 10, 2019

Related U.S. Application Data

(60) Provisional application No. 62/653,568, filed on Apr. 6, 2018.

(30) Foreign Application Priority Data

Nov. 19, 2018   (KR) .......................... 10-2018-0142916

(51) Int. Cl.
    *A01D 34/00*      (2006.01)
    *G05D 1/02*       (2020.01)
    (Continued)

(52) U.S. Cl.
    CPC ........... *A01D 34/008* (2013.01); *A01D 34/81* (2013.01); *A01D 69/02* (2013.01); *G05D 1/0225* (2013.01);
    (Continued)

(58) Field of Classification Search
    CPC ...... A01D 34/008; A01D 34/81; A01D 69/02; A01D 2101/00; G05D 1/0225; G05D 1/0242; G05D 2201/0208
    See application file for complete search history.

(56) References Cited

U.S. PATENT DOCUMENTS

| 2,464,912 A | 3/1949 | White |
|---|---|---|
| 3,114,229 A | 12/1963 | Wilson |
| (Continued) | | |

FOREIGN PATENT DOCUMENTS

| AU | 2015418271 | 6/2017 |
|---|---|---|
| CN | 102523841 | 7/2012 |
| (Continued) | | |

OTHER PUBLICATIONS

United States Office Action dated Mar. 4, 2021 issued in U.S. Appl. No. 16/260,865.

(Continued)

*Primary Examiner* — Abigail A Risic
(74) *Attorney, Agent, or Firm* — KED & Associates LLP

(57) ABSTRACT

A lawn mower robot includes an outer cover; an inner body accommodated into the outer cover to mount wheels for traveling on both sides thereof; wheel drive motors mounted on both sides of the inner body, respectively, to drive the wheels, respectively; a rotating plate rotatably mounted on a bottom surface of the inner body; blades rotatably mounted on the rotating plate to mow the grass; a blade drive motor mounted inside the inner body to rotate the blades together with the rotating plate; a battery mounted inside the inner body to supply power to the wheel drive motor and the blade drive motor; a battery receiving portion extended upward in a protruding manner from a bottom surface of the inner body (Continued)

toward an inner space of the inner body to accommodate the battery therein; and a battery cover mounted to cover the battery receiving portion.

20 Claims, 12 Drawing Sheets

(51) Int. Cl.
    *A01D 34/81*       (2006.01)
    *A01D 69/02*       (2006.01)
    *A01D 101/00*     (2006.01)

(52) U.S. Cl.
    CPC ....... *G05D 1/0242* (2013.01); *A01D 2101/00* (2013.01); *G05D 2201/0208* (2013.01)

(56) References Cited

U.S. PATENT DOCUMENTS

| | | | |
|---|---|---|---|
| 4,194,345 A * | 3/1980 | Pioch | A01D 34/81 56/17.5 |
| 4,835,952 A | 6/1989 | McLane | |
| 5,259,175 A | 11/1993 | Schmidt | |
| 6,000,232 A | 12/1999 | Witten-Hannah et al. | |
| 6,470,588 B1 | 10/2002 | Pilger | |
| 6,999,850 B2 | 2/2006 | McDonald | |
| 7,171,799 B2 | 2/2007 | Takeishi et al. | |
| 8,234,848 B2 * | 8/2012 | Messina | A01D 34/81 56/17.1 |
| 8,336,282 B2 | 12/2012 | Messina et al. | |
| 8,387,193 B2 | 3/2013 | Ziegler et al. | |
| 9,021,777 B2 | 5/2015 | Johnson et al. | |
| 9,027,189 B2 | 5/2015 | Hickenbottom et al. | |
| 9,807,930 B1 | 11/2017 | Lydon et al. | |
| 10,299,432 B1 | 5/2019 | Kelly et al. | |
| 10,375,880 B2 * | 8/2019 | Morin | B25J 5/007 |
| 10,555,457 B2 | 2/2020 | Song et al. | |
| 2005/0021181 A1 | 1/2005 | Kim et al. | |
| 2005/0044836 A1 | 3/2005 | Goto et al. | |
| 2008/0196427 A1 | 8/2008 | Bianchi et al. | |
| 2010/0070083 A1 | 3/2010 | Kim et al. | |
| 2012/0023880 A1 | 2/2012 | Messina et al. | |
| 2012/0023887 A1 | 2/2012 | Messina et al. | |
| 2012/0204581 A1 | 8/2012 | Kang et al. | |
| 2013/0000333 A1 | 1/2013 | Kim et al. | |
| 2013/0061417 A1 | 3/2013 | Vanderstegen-Drake et al. | |
| 2013/0291506 A1 | 11/2013 | Johnson et al. | |
| 2014/0216424 A1 | 8/2014 | Gartzke et al. | |
| 2015/0271991 A1 | 10/2015 | Balutis | |
| 2016/0000007 A1 | 1/2016 | Bian et al. | |
| 2016/0014956 A1 | 1/2016 | Matsumoto et al. | |
| 2016/0081526 A1 | 3/2016 | Gottinger et al. | |
| 2016/0128275 A1 | 5/2016 | Johnson | |
| 2016/0278287 A1 | 9/2016 | Kasai et al. | |
| 2016/0338262 A1 | 11/2016 | Liu et al. | |
| 2017/0181375 A1 | 6/2017 | Hashimoto et al. | |
| 2018/0116109 A1 | 5/2018 | Matsumoto | |
| 2018/0184583 A1 * | 7/2018 | Morin | A01D 34/008 |
| 2018/0184585 A1 | 7/2018 | Song et al. | |
| 2018/0199506 A1 * | 7/2018 | Ito | A01D 34/81 |
| 2018/0235146 A1 * | 8/2018 | Hashimoto | A01D 34/008 |
| 2018/0271014 A1 * | 9/2018 | Matsuzawa | A01D 34/008 |
| 2019/0216012 A1 | 7/2019 | Hahn et al. | |
| 2019/0223376 A1 * | 7/2019 | Lee | B25J 13/088 |
| 2019/0258267 A1 * | 8/2019 | Hahn | A01D 34/008 |
| 2019/0278269 A1 | 9/2019 | He et al. | |
| 2020/0170186 A1 | 6/2020 | Curtis | |

FOREIGN PATENT DOCUMENTS

| | | |
|---|---|---|
| CN | 102934565 | 2/2013 |
| CN | 105746094 | 7/2016 |
| CN | 206808075 | 12/2017 |
| DE | 698 31 028 | 5/2006 |
| DE | 20 2013 006712 | 10/2013 |
| DE | 20 2012 102 637 | 12/2013 |
| DE | 10 2013 212 605 | 12/2014 |
| DE | 10 2015 221 128 | 5/2016 |
| EP | 2 412 219 | 2/2012 |
| EP | 2 425 700 | 3/2012 |
| EP | 2 656 718 | 10/2013 |
| EP | 2 656 720 | 10/2013 |
| EP | 2 803 255 | 11/2014 |
| EP | 2 997 869 | 3/2016 |
| EP | 03222132 | 9/2017 |
| EP | 2 687 077 | 12/2017 |
| EP | 3 315 000 | 5/2018 |
| EP | 3 338 041 | 6/2018 |
| EP | 3 513 644 | 7/2019 |
| JP | H10-300316 | 11/1998 |
| JP | H10-332239 | 12/1998 |
| JP | 2000-258028 | 9/2000 |
| JP | 2002-039663 | 2/2002 |
| JP | 2002-130908 | 5/2002 |
| JP | 2003-139454 | 5/2003 |
| JP | 2003-322454 | 11/2003 |
| JP | 2006-242463 | 9/2006 |
| JP | 2009-041883 | 2/2009 |
| JP | 2012-105557 | 6/2012 |
| JP | 2012-242074 | 12/2012 |
| JP | 3180497 | 12/2012 |
| JP | 2013-000028 | 1/2013 |
| JP | 2016-049048 | 4/2016 |
| JP | 2016-123364 | 7/2016 |
| JP | 2016-185099 | 10/2016 |
| JP | 2016-208886 | 12/2016 |
| JP | 2016-208950 | 12/2016 |
| JP | 2017-118842 | 7/2017 |
| JP | 2017-154567 | 9/2017 |
| KR | 10-1997-0039324 | 7/1997 |
| KR | 20-1998-0002204 | 3/1998 |
| KR | 10-2005-0081398 | 8/2005 |
| KR | 10-2011-0110034 | 10/2011 |
| KR | 10-2015-0125508 | 11/2015 |
| KR | 10-2018-0079799 | 7/2018 |
| KR | 10-1915547 | 11/2018 |
| WO | WO 2008/120862 | 10/2008 |
| WO | WO 2017/051663 | 3/2017 |
| WO | WO 2017/109877 | 6/2017 |
| WO | WO 2017/109879 | 6/2017 |
| WO | WO 2018/001358 | 1/2018 |
| WO | WO 2018/125222 | 7/2018 |

OTHER PUBLICATIONS

United States Office Action dated Mar. 4, 2021 issued in U.S. Appl. No. 16/264,494.
European Search Report dated Aug. 22, 2019 issued in EP Application No. 19152775.3.
European Search Report dated Aug. 22, 2019 issued in EP Application No. 19167018.1.
European Search Report dated Aug. 22, 2019 issued in EP Application No. 19152520.3.
European Search Report dated Aug. 22, 2019 issued in EP Application No. 19166925.8.
European Search Report dated Aug. 26, 2019 issued in EP Application No. 19167302.9.
European Search Report dated Sep. 2, 2019 issued in EP Application No. 19167046.2.
European Search Report dated Sep. 2, 2019 issued in EP Application No. 19167334.2.
European Search Report dated Sep. 2, 2019 issued in EP Application No. 19167328.4.
Australian Office Action dated Sep. 13, 2019 issued in AU Application No. 2019200604.
European Search Report dated Dec. 17, 2019 issued in EP Application No. 19167046.2.
Korean Notice of Allowance dated Jan. 5, 2021 issued in KR Application No. 10-2018-0121333.
European Search Report dated May 25, 2020 issued in EP Application No. 20150244.0.

(56) References Cited

OTHER PUBLICATIONS

European Search Report dated May 25, 2020 issued in EP Application No. 20150245.7.
European Search Report dated May 25, 2020 issued in EP Application No. 20150248.1.
Korean Office Action dated May 15, 2020 issued in KR Application No. 10-2018-0123916.
Korean Office Action dated May 25, 2020 issued in KR Application No. 10-2018-0127707.
Korean Office Action dated Jun. 12, 2020 issued in KR Application No. 10-2018-0142914.
Korean Office Action dated Jun. 12, 2020 issued in KR Application No. 10-2018-0142916.
Korean Office Action dated Jun. 12, 2020 issued in KR Application No. 10-2018-0142917.
Korean Office Action dated Jun. 12, 2020 issued in KR Application No. 10-2018-0142918.
Korean Notice of Allowance dated Nov. 23, 2020 issued in KR Application No. 10-2018-0123916.
Korean Notice of Allowance dated Dec. 8, 2020 issued in KR Application No. 10-2018-0142916.
Korean Notice of Allowance dated Dec. 8, 2020 issued in KR Application No. 10-2018-0142917.
U.S. Appl. No. 16/260,865, filed Jan. 29, 2019.
U.S. Appl. No. 16/264,494, filed Jan. 31, 2019.
U.S. Appl. No. 16/373,050, filed Apr. 2, 2019.
U.S. Appl. No. 16/375,505, filed Apr. 4, 2019.
U.S. Appl. No. 16/375,217, filed Apr. 4, 2019.
U.S. Appl. No. 16/375,294, filed Apr. 4, 2019.
U.S. Appl. No. 16/375,400, filed Apr. 4, 2019.
United States Office Action dated Mar. 11, 2021 issued in U.S. Appl. No. 16/375,400.
United States Office Action dated Mar. 16, 2021 issued in U.S. Appl. No. 16/375,217.
United States Notice of Allowance dated Apr. 1, 2021 issued in U.S. Appl. No. 16/375,294.
United States Office Action dated Apr. 9, 2021 issued in U.S. Appl. No. 16/375,505.
United States Office Action dated Apr. 12, 2021 issued in U.S. Appl. No. 16/373,050.
Korean Notice of Allowance dated Nov. 26, 2020 issued in Application No. 10-2018-0121331.
Korean Notice of Allowance dated Dec. 2, 2020 issued in Application No. 10-2018-0142918.
Korean Notice of Allowance dated Nov. 23, 2020 issued in Application No. 10-2018-0127707.

* cited by examiner

LAWN MOWER ROBOT

CROSS-REFERENCE TO RELATED APPLICATION(S)

Pursuant to 35 U.S.C. § 119(a), this application claims the benefit of the earlier filing date and the right of priority to U.S. Provisional Application No. 62/653,568, filed on Apr. 6, 2018, and Korean Application No. 10-2018-0142916, filed on Nov. 19, 2018, whose entire disclosures are hereby incorporated by reference. This application is also related to U.S. application Ser. No. 16/373,050 filed Apr. 2, 2019, U.S. application Ser. No. 16/375,505 filed Apr. 4, 2019, U.S. application Ser. No. 16/375,217 filed Apr. 4, 2019, U.S. application Ser. No. 16/375,294 filed Apr. 4, 2019, and U.S. application Ser. No. 16/375,400 filed Apr. 4, 2019, whose entire disclosures are also hereby incorporated by reference. This application is also related to U.S. patent application Ser. No. 16/260,865 filed on Jan. 29, 2019 and U.S. patent application Ser. No. 16/264,494 filed on Jan. 31, 2019.

BACKGROUND

1. Field

The present disclosure relates to a lawn mower robot for mowing the grass with a blade rotated by a motor.

2. Background

Lawn mower is a device for cutting and trimming the grass planted in a yard at home, a playground, a golf course, or the like. In recent years, an automated robot-type lawn mower has been developed to reduce a user's labor of having to manually operate a lawn mower to mow the grass and reduce an additional cost incurred by hiring outsiders to mow the grass.

A lawn mower robot may be traveled by rotating a plurality of wheels with an electric motor mounted on both front and rear sides of a robot body, and a traveling direction of the robot may be manipulated by controlling the number of revolutions of electric motor.

A patent application for a lawn mower robot (KR 10-2017-0000416, filed on Jan. 2, 2017, now issued as Korean Patent No. 10-1915547), describes that the lawn mower robot may be mounted with a motor inside an inner body to rotate a blade using the power of the motor so as to cut the grass. A wire may be provided along an edge of a predetermined region such that a lawn mower robot in the related art performs lawn mowing within the predetermined region outdoors. For example, the lawn mower robot has a coil sensor, and when the lawn mower robot touches the wire while traveling, the coil sensor senses a contact between the wire and the robot, and the lawn mower robot changes the traveling direction to perform lawn mowing within a predetermined region.

The lawn mower robot in the related art is designed in such a manner that a coil sensor is assembled in a coil sensor holder and then the coil sensor holder assembled with the coil sensor is assembled in an inner body of the lawn mower robot. However, the coil sensor holder in the related art is complicated in structure, and the process of assembling the coil sensor into the coil sensor holder in a first stage and the process of assembling the coil sensor holder assembly into the inner body in a second stage are separately carried out, thereby causing a problem of increasing the number of processes and manufacturing cost.

Meanwhile, the lawn mower robot of the granted patent is configured to mount an ultrasonic sensor module in front of an outer body of the robot to sense an obstacle, and an infrared ray sensor that recognizes the location of a charging stand for charging is applied to an inside of the ultrasonic sensor module.

An IR window is configured to be integrally applied to the ultrasonic sensor module as a separate transparent window for transmitting or receiving infrared rays. However, when an IR window with a transparent window and a non-transparent case with an ultrasonic sensor module are separately manufactured and then two components are assembled into one, there is a problem that the structure of the case is complicated and the number of assembling processes increases.

Furthermore, the lawn mower robot in the related art repeatedly collides with obstacles when exposed outdoors for a long period of time, thereby causing a problem that a bumper installed in front of the outer body is lifted. In addition, the lawn mower robot in the related art has a battery mounted inside a separate battery case, and the battery case is inserted into and coupled to a battery receiving portion formed to correspond to a shape of the battery case in the body of the robot.

In this case, the battery case separately provided from the robot body must be manufactured, and thus there is a problem that the manufacturing cost is increased. Moreover, a fastening portion of the battery case must further be provided to fasten the battery case to the body of the robot, there is a problem that the battery case increases and the number of assembling processes increases.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
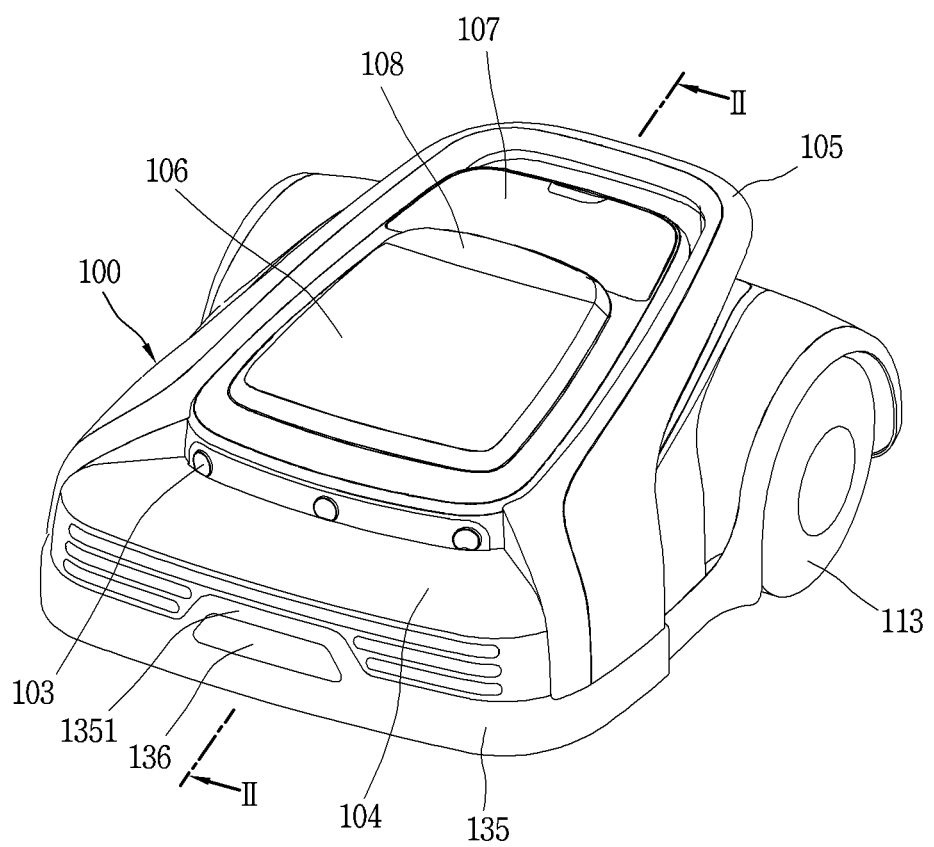
FIG. 1 is a perspective view showing an appearance of a lawn mower robot according to the present disclosure.
Figure 2:
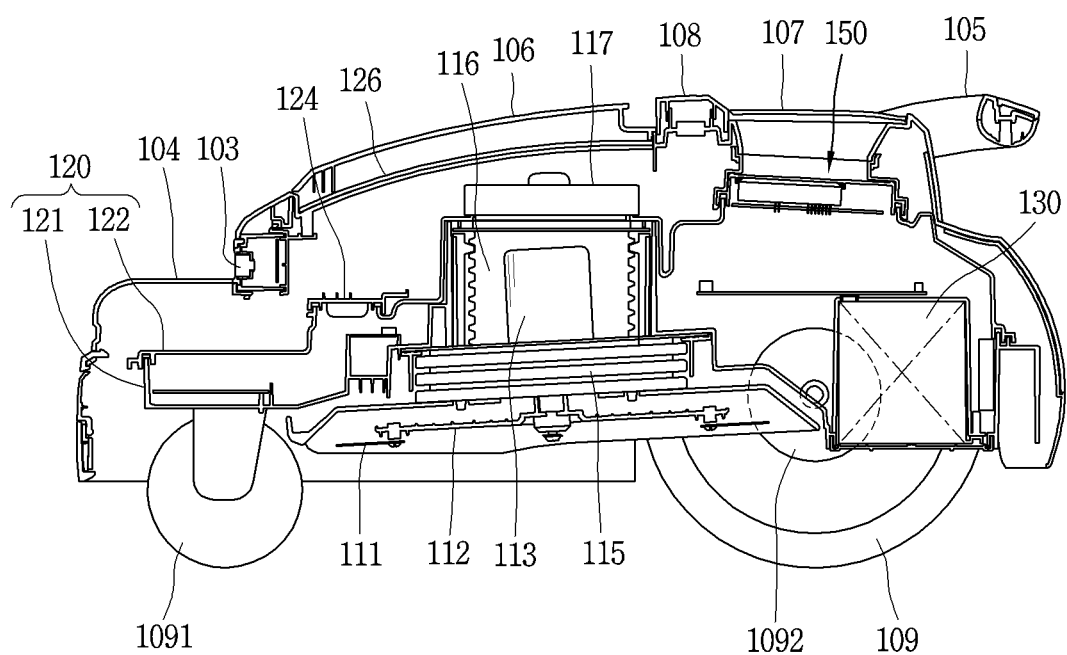
FIG. 2 is a cross-sectional view taken along line II-II in FIG. 1.
Figure 3:
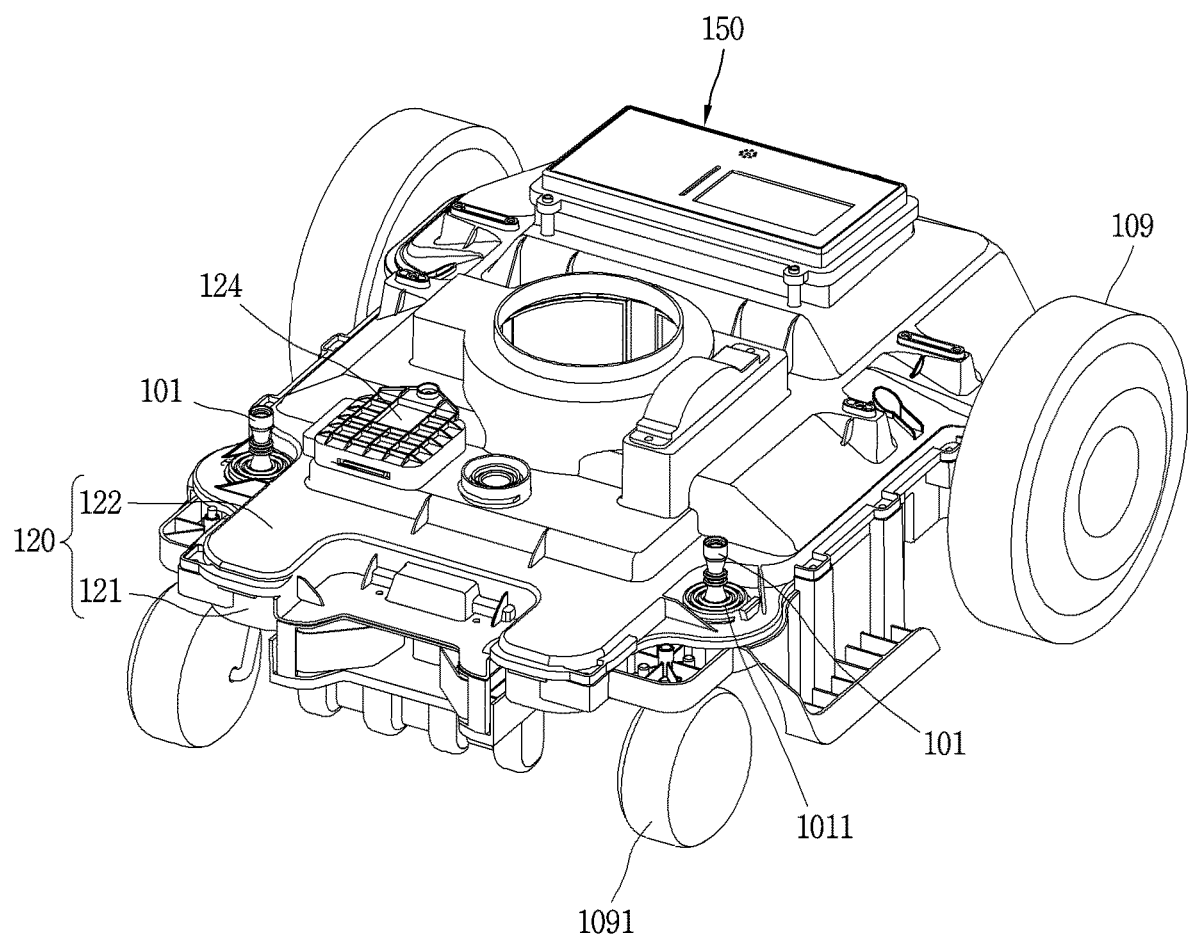
FIG. 3 is a conceptual view showing an inner body subsequent to removing an outer cover in FIG. 1.

FIG. 1 is a perspective view showing an appearance of a lawn mower robot according to the present disclosure, and FIG. 2 is a cross-sectional view taken along line II-II in FIG. 1, and FIG. 3 is a conceptual view showing an inner body (or inner frame) 120 subsequent to removing an outer cover 100 in FIG. 1.

The lawn mower robot of the present disclosure includes an outer cover 100 and an inner body 120. The outer cover 100 is configured to enclose the inner body 120. The inner body 120 may be accommodated into the outer cover 100. The outer cover 100 may be supported movably in front-rear and left-right directions with respect to the inner body 120 by a plurality of support portions.

The plurality of support portions 101, 102 may be disposed to be spaced apart from each other in front, rear, left and right directions on an upper portion of the inner body 120. For example, two front support portions 101 may be spaced apart from each other in a width direction on a front side of the inner body 120, and two rear support portions 102 may be spaced apart in a width direction on a rear side of the inner body 120.

Each of the plurality of support portions 101, 102 may be made of a rubber material. Each of the plurality of support portions 101, 102 is formed in a cylindrical rod shape elongated in a vertical direction, and formed to have a smaller cross-sectional area from an upper end portion to a middle portion thereof or from a lower end portion to a middle portion thereof.

For each of the plurality of support portions 101, 102, an upper end portion thereof may be fastened to the outer cover 100 and a lower end portion thereof may be fastened to the inner body 120. The front support portion 101 of the plurality of support portions may have a corrugated portion 1011 extended in a bellows shape in a radial direction at a lower end portion thereof. The front support portion 101 may elastically support the outer cover 100 so as to be movable in front, rear, left, and right directions with respect to the inner body 120 by the corrugated portion 1011.

The rear support portion 102 may elastically support the outer cover 100 by bending the upper end portion in front, rear, left, and right directions about the lower end portion. When the outer cover 100 may move in front, rear, left, and right directions with respect to the inner body 120 while colliding with obstacles, thereby mitigating an impact.

A plurality of ultrasonic sensor modules (or ultrasonic sensors) 103 may be mounted on a front side of the outer cover 100. The plurality of ultrasonic sensor modules 103 may be spaced apart in a width direction. Each of the plurality of ultrasonic sensor modules 103 may transmit ultrasonic waves and receive reflection waves reflected by obstacles to sense an obstacle located in front of the ultrasonic sensor module 103.

An ultrasonic guide unit 104 may be formed in a planar shape on a front side of the outer cover 100, and the ultrasonic guide unit 104 may be extended forward from a lower portion of the plurality of ultrasonic sensor modules 103, 103, thereby limiting ultrasonic waves to be transmitted at a predetermined height or more.

A handle 105 may be provided at an upper portion of the outer body to allow the user to grip the handle 105 with his or her hand to carry the robot. The handle 105 may be composed of a front fastening portion, an intermediate inclined portion, and a rear grip portion.

The front fastening portions are respectively fastened to both front side surfaces of the outer cover 100, and the intermediate inclined portions may be extended rearward in an upwardly inclined manner from the front fastening portions. The rear grip portion, which is a portion held by the user with his or her hand, may be configured to connect a rear end portion of the intermediate inclined portion.

A first upper cover 106 and a second upper cover 107 may be mounted at an upper portion of the outer cover 100 so as to be open and closed. Each of the first upper cover 106 and the second upper cover 107 may be coupled to the inner body 120 with a hinge at a front end thereof, and thus a rear end thereof may be rotatably mounted in a vertical direction.

The first upper cover 106 may be formed to be inclined downward from a rear end thereof to a front end thereof such that the front end is located lower than the rear end in a length direction. The first upper cover 106 may be formed to be inclined downward in right and left directions from a central portion thereof such that the left and right end portions of the first upper cover 106 are located lower than the center portion.

According to such a configuration, the first upper cover 106 and the second upper cover 107 may guide rainwater to flow downward to an outer lower portion thereof without being collected in an upper portion of the outer cover 100 during raining. A stop switch 108 may be provided in a pushable manner between the first upper cover 106 and the second upper cover 107. The stop switch 108 may be used by the user in an emergency.

The stop switch 108 may be located slightly higher than the first and second upper covers 106, 107, and configured to be located at the same position as the rear grip portion of the handle 105. According to such a configuration, when the robot passes an obstacle such as a branch or the like at a position lower than the height of the robot, the stop switch 108 may be pushed in touch with the obstacle ahead of the rear grip portion of the handle 105 to stop the robot and prevent the handle 105 from being caught by the obstacle.

A rain sensor may be provided on one side of the upper portion of the outer cover 100 to sense rain during raining. According to such a configuration, the lawn robot may be configured to sense rain through the rain sensor and return to a charging stand.

Wheel drive motors may be mounted on both sides of the inner body 120 to drive the robot. The wheel drive motor has a drive shaft, and a wheel 109 may be connected to the drive shaft. The plurality of wheels 109 may be rotated by receiving a rotational force from the wheel drive motor through the drive shaft.

The plurality of wheels 109 may be independently driven by the wheel drive motor. The plurality of wheel drive motors are independently connected to the plurality of wheels 109, and the number of revolutions may be controlled differently from the control unit.

A plurality of casters 1091 may be orbitably mounted on a bottom surface of the inner body 120 in a left-right direction about a central shaft vertically extended. According to such a configuration, the control unit controls the plurality of wheel drive motors to control the number of rotations of the wheels 109 differently, thereby allowing the robot to travel in a desired direction.

The lawn mower robot may have a blade assembly inside the inner body 120 to cut the grass. The blade assembly may be disposed at a central portion of the inner body 120. The blade assembly may include a lifting frame 110, a plurality of blades 111, a rotating plate 112, a blade protection cover 114, a rotating cylindrical portion 116, a height adjusting knob 117, and the like.

The blade assembly is located at a lower portion of the first upper cover 106, and when the first upper cover 106 is open, the height adjusting knob 117 of the blade assembly may be seen by the user. The user may adjust the height of the blade 111 using the height adjusting knob 117.

The lifting frame 110 may be mounted into the inner body 120 in a vertically movable manner. The rotating plate 112 may be rotatably mounted on a bottom surface of the lifting frame 110. The blade driving motor 113 may be mounted into the lifting frame 110.

The plurality of blades 111 and the rotating plate 112 may be rotatably disposed on a bottom surface of the inner body 120. The blade protection cover 114 is disposed on a bottom surface of the inner body 120, and disposed to cover the rotating plate 112 and the plurality of blades 111.

A motor shaft may be configured to in a protruding manner at a lower portion of the blade drive motor 113, and the motor shaft may be coupled to a shaft coupling portion 1413 formed at a central portion of the rotating plate 112 to allow the rotating plate 112 to rotate by receiving power from the blade drive motor 113.

A plurality of blades 111 may be rotatably mounted on a bottom surface of the rotating plate 112. One end portion of each of the plurality of blades 111 may be hinge-coupled to the rotating plate 112 by a fastening bolt, and the other end thereof may be folded inward or unfolded outward in a radial direction of the rotating plate 112 about the fastening bolt. According to such a configuration, the plurality of blades 111 may cut the grass while rotating together with the rotating plate 112 when the robot is traveling.

The blade protection cover 114 may be provided on a bottom surface of the lifting frame 110, and the blade protection cover 114 may be mounted in a vertically movable manner together with the lifting frame 110. The rotating plate 112 and the plurality of blades 111 may be disposed to be accommodated into the blade protection cover 114, and the rotating plate 112 may be spaced apart downward from an upper surface portion of the blade protection cover 114, and mounted rotatably with respect to the blade protection cover 114.

The blade protection cover 114 has a plurality of protrusion portions 1141 and a plurality of grass inlets 1142 in front, and the plurality of protrusion portions 1141 and the plurality of grass inlets 1142 may be alternately disposed apart from each other.

The blade protection cover 114 may have inclined portions 1143 on right and left side surfaces and a rear surface thereof. The inclined portion 1143 may be extended in a downwardly inclined manner from an upper surface of the blade protection cover 114. According to such a configuration, the inclined portion 1143 and the plurality of protruding portions 1141 may block stone fragments from being scattered in left-right and rearward directions and thrown out to an outside of the outer cover 100 when the blades 111 collide with stones or the like. In addition, the plurality of grass inlets 1142 may minimize resistance when the grass enters inward from a front side of the blade protection cover 114.

The plurality of blades 111, the rotating plate 112, and the blade protection cover 114 may be mounted in a vertically movable manner together with the lifting frame 110 to adjust the height of the plurality of blades 111. A height adjusting unit of the blade 111 may be provided for adjusting the height of the blade 111.

The height adjusting unit of the blade 111 may include a height adjusting knob 117, a rotating cylindrical portion 116, and a lifting frame 110. The height adjusting knob 117 may be rotatably mounted at an upper portion of the inner body 120 in place. A handle portion may be formed on an upper surface of the height adjusting knob 117 and extended in a radial direction, and configured to allow the user to rotate the height adjusting knob 117 while holding the handle portion.

The rotating cylindrical portion 116 may be coupled to a lower portion of the height adjusting knob 117, and rotatably mounted together with the height adjusting knob 117. A male screw portion may be formed on an outer circumferential surface of the rotating cylindrical portion 116. The rotating cylindrical portion 116 may be accommodated in the lifting frame 110. A lowering limit portion may be provided at an upper end portion of the rotating cylindrical portion 116 and rotatably mounted at an upper portion of the inner body 120.

A plurality of spiral protrusions may be formed on an inner circumferential surface of the lifting frame 110, and the spiral protrusions may be engaged with the male screw portions of the rotating cylindrical portion 116. Rotation limit portions are protruded from both sides of an outer circumferential surface of the lifting frame 110 to only allow the lifting frame 110 to move in a vertical direction with no rotation. According to such a configuration, the lifting frame 110 may move in a vertical direction along the male screw portion as the rotating cylindrical portion 116 rotates.

A blade sealing portion 115 may be disposed between a lower portion of the inner body 120 and a bottom surface of the lifting frame 110. An upper end portion of the blade sealing portion 115 may be fastened to a lower portion of the inner body 120, and a lower end portion of the blade sealing portion 115 may be fastened to a bottom surface of the lifting frame 110 together with the blade protection cover 114.

A bellows-shaped corrugated portion may be extended in a length-adjustable manner in a vertical direction on a side surface of the blade sealing portion 115. According to such a configuration, the corrugated portion may be adjusted in length in a vertical direction by being unfolded or folded in a length direction, and watertightness may be maintained between a lower portion of the inner body 120 and the blade protection cover 114 even when the blade protection cover 114, the rotating plate 112, and the plurality of blades 111 move in a vertical direction together with the lifting frame 110, thereby preventing the blade drive motor 113 from being damaged due to water infiltration into the inner body 120, for example, into the lifting frame 110.

The inner body 120 may include an inner body unit 121 and an inner body cover 122. A receiving space may be formed inside the inner body unit 121. The inner body cover 122 may be mounted to cover an upper portion of the inner body unit 121.

A semiconductor device such as an inverter for driving a motor and electrical devices such as a circuit board 1243 on which the semiconductor device and the like are mounted are mounted into the inner body 120, and a wire may be configured to electrically connect various types of electrical devices. A controller for controlling the blade drive motor 113, the wheel drive motor, and the like may be mounted inside the inner body 120. The controller may be configured to control an overall operation of the lawn mower robot. The controller may be implemented as a central processing unit (CPU) capable of processing data. Various software may be installed in the CPU.

A user interface (UI) module may be mounted at a rear upper portion of the inner body cover 122. A plurality of operation buttons may be provided at an upper portion of the UI module to allow the user to operate the robot so as to control the operation of the robot. The plurality of operation buttons may be implemented in various ways such as a button type, a touch type, and the like.

Figure 4:
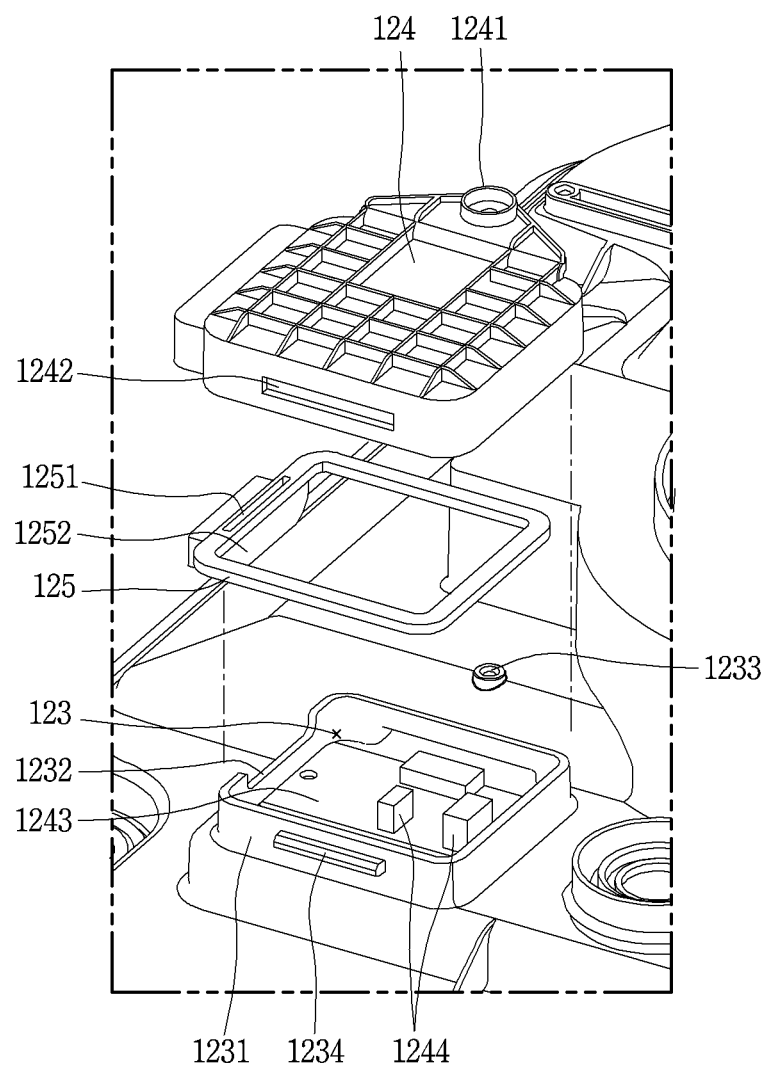
FIG. 4 is a conceptual view showing a state in which an external input terminal port cover is disassembled from an inner body cover in FIG. 3.
Figure 5:
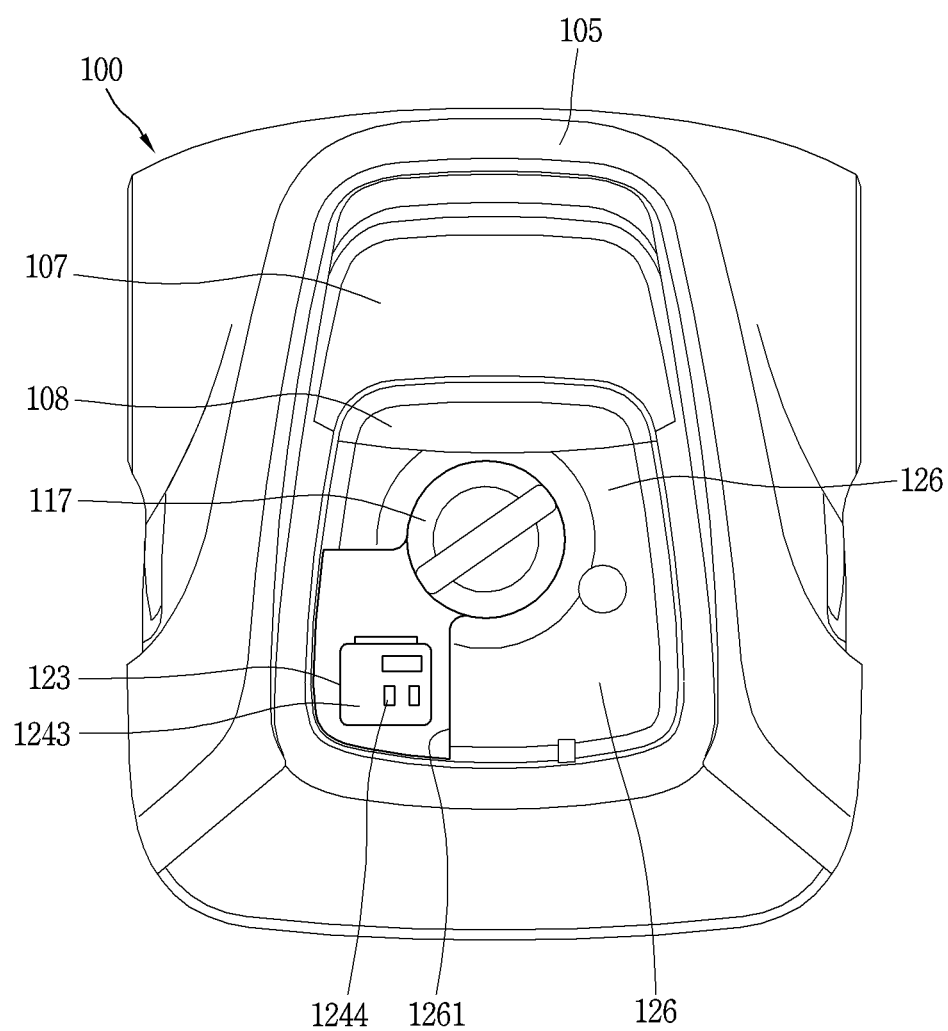
FIG. 5 is a plan view showing an external input terminal port subsequent to removing a first upper cover from the outer cover in FIG. 1.

FIG. 4 is a conceptual view showing a state in which an external input terminal port cover 124 is disassembled from an inner body cover 122 in FIG. 3, and FIG. 5 is a plan view showing an external input terminal port 1244 subsequent to removing a first upper cover 106 from the outer cover 100 in FIG. 1.

An opening portion (or opening) 123 may be formed on a front side of the inner body cover 122, and the external input terminal port cover 124 may be detachably mounted to cover the opening portion 123. A connector or wire may be connected to a CPU mounted into the inner body 120 through the opening portion 123 during maintenance or the external input terminal port 1244 may be mounted on a circuit board 1243. An external input terminal (e.g., including USB or the like) may be connected to the external input port 1244 to continuously reflect software improvements through software updates.

A waterproof rib 1231 may be extended to protrude upward along a circumference of the opening portion 123. The waterproof rib 1231 may be formed in a rectangular box shape. A cutout portion 1232 may be formed at one side of the waterproof rib 1231.

The external input terminal port cover 124 may be mounted to cover an upper portion of the waterproof rib 1231. A coupling protrusion 1234 may be extended in a left-right direction and protruded forward from one side of the waterproof rib 1231. A coupling hole 1242 may be formed on one side of the external input terminal port cover 124 to extend in a left-right direction so as to correspond to the coupling protrusion 1234 and penetrate in a forward direction.

A fastening portion 1241 may be provided at a rear portion of the external input terminal port cover 124, and a fastening hole 1321 may be formed through the fastening portion 1241. A boss portion 1233 may be formed on one side of the inner body cover 122 to correspond to the fastening portion 1241. A fastening groove may be formed inside the boss portion 1233.

A fastening member (or fastener) such as a screw may be fastened to the fastening groove 1251 of the boss portion 1233 through the fastening portion 1241 of the external input terminal port cover 124, thereby fastening the external input terminal port cover 124 to the inner body cover 122. The coupling protrusion 1234 of the waterproof rib 1231 may be inserted into and coupled to the coupling hole 1242 of the external input terminal port cover 124 to couple the external input terminal port cover 124 to the waterproof rib 1231.

A mounting rib 1245 is formed to protrude downward along an edge on an inner side surface of the external input terminal port cover 124, and the mounting rib 1245 may form a sealer mounting groove at an inner side along with an outer edge portion protruded along an edge of the external input terminal port cover 124.

A connector sealer 125 may be formed of a rubber material. A connector sealer 125 may be formed in a rectangular cross section, and extend along an edge of the external input terminal port cover 124. The connector sealer 125 may be inserted and mounted on the sealer mounting groove.

A fastening groove 1251 may be formed at one side of the connector sealer 125 to fasten the external input terminal port cover 124 to the connector sealer 125. A fastening protrusion may be protruded from an inner surface of the external input terminal port cover 124, and inserted into and coupled to the fastening groove 1251 of the connector sealer 125. The connector sealer 125 may be disposed between an upper end of the waterproof rib 1231 and an inner surface of the external input terminal port cover 124.

A sealer protruding portion 1252 may be extended downward from one side of the connector sealer 125 to cover the cutout portion 1232 of the waterproof rib 1231. According to such a configuration, the connector sealer 125 may be disposed between the inner body 120 and the external input terminal port cover 124 to maintain airtightness and prevent water from infiltrating into the inner body 120 through the opening portion 123. The external input terminal port 1244 may be disposed at a lower portion of the first upper cover 106, and configured to allow the user to view the external input terminal port cover 124 when the first upper cover 106 is open.

The outer cover 100 may have an inner cover 126 at an upper inner side thereof. The inner cover 126 may be spaced apart from an inner surface of the first upper cover 106 in a downward direction. The inner cover 126 may be formed with an opening portion 1261 on a front right side thereof.

The opening portion 1261 is disposed to face the external input terminal port cover 124 in a vertical direction, and configured to expose the external input terminal port 1244 in an upward direction of the inner cover 126 through the opening portion 1261. According to such a configuration, when the user opens the first upper cover 106 for software update, the external input terminal port 1244 may be exposed upward through the opening portion 1261, thereby facilitating software updates, and continuously reflecting software improvements.

Furthermore, the external input terminal port 1244 may be disposed close to the height adjusting unit of the blade 111. According to such a configuration, the external input terminal port 1244 and the height adjusting knob 117 may be gathered in one place below the first upper cover 106, and the user may see the external input terminal port 1244, the height adjusting knob 117, the height display window of the blade 111, and the like at a glance, thereby facilitating the height adjustment of the blade 111 and maintenance such as software update.

Figure 6:
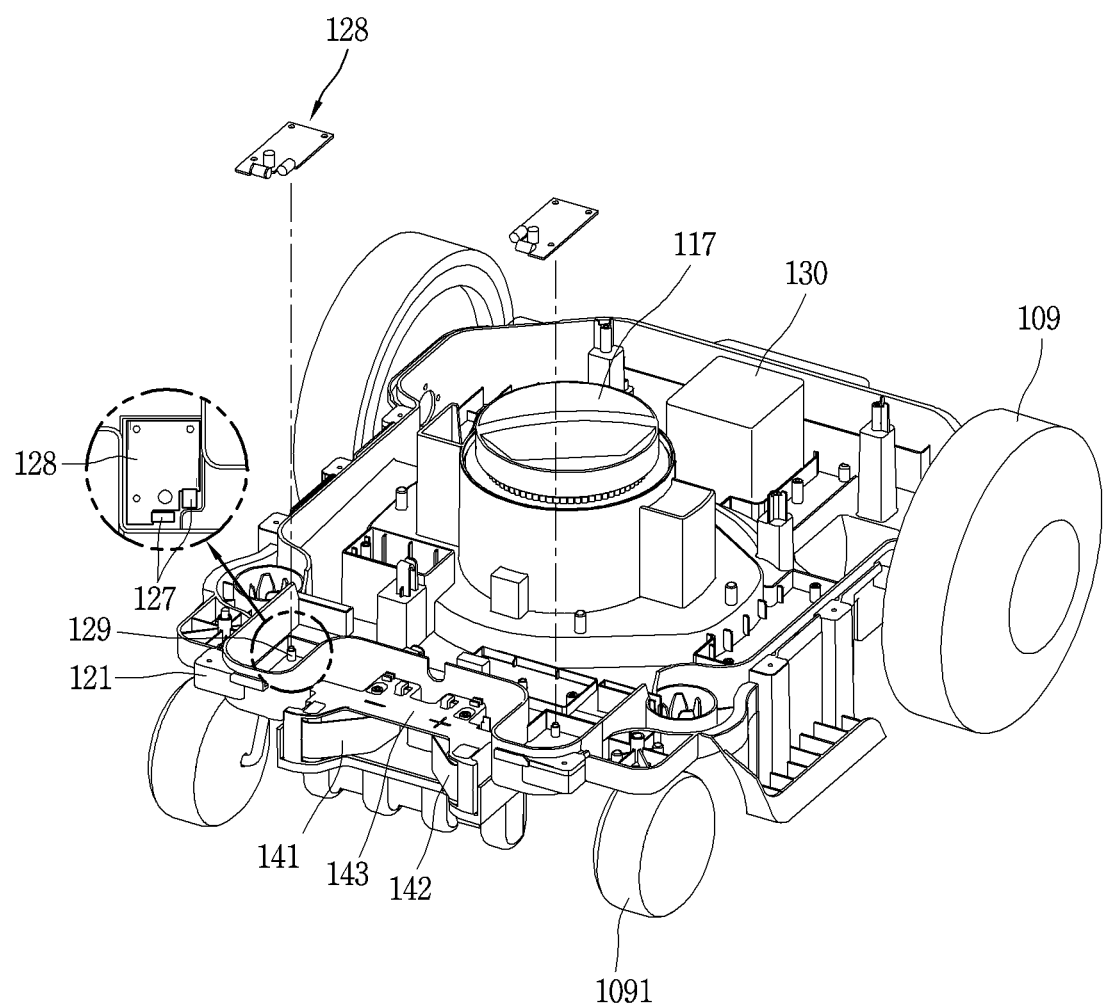
FIG. 6 is a conceptual view showing a state in which a coil sensor circuit board is disassembled from an inner body unit subsequent to removing the inner body cover in FIG. 3.

FIG. 6 is a conceptual view showing a state in which a coil sensor circuit board 128 is disassembled from the inner body unit 121 subsequent to removing the inner body cover 122 in FIG. 3. The coil sensor 127 may be mounted inside the inner body 120. The coil sensor 127 is configured to sense a wire provided to limit the moving section of the lawn mower robot during lawn mowing.

The coil sensor 127 may be mounted to the circuit board 128. The coil sensor circuit board 128 on which the coil sensor 127 is mounted may be mounted on a front side of the inner body 121. A plurality of fastening holes 1321 may be formed at an edge portion of the coil sensor circuit board 128, and a plurality of boss portions 129 for mounting the coil sensor circuit board 128 may be protruded upward on a bottom surface of the inner body unit 121.

A fastening groove may be formed inside the plurality of boss portions 129. Each of the plurality of boss portions 129 may be disposed such that the fastening groove thereof communicates with the fastening hole 1321 of the coil sensor circuit board 128. Fastening members (or fasteners) such as screws or the like may be fastened to the plurality of boss portions 129 through the fastening holes of the coil sensor circuit board 128 to allow the coil sensor circuit board 128 to be fastened to the inner body 120. According to such a configuration, the coil sensor in the related art may be changed to a type of circuit board 128, and thus an additional holder for the coil sensor 127 may not be required, thereby simplifying the structure of the coil sensor to easily mount the coil sensor into the inner body 120.

Figure 7:
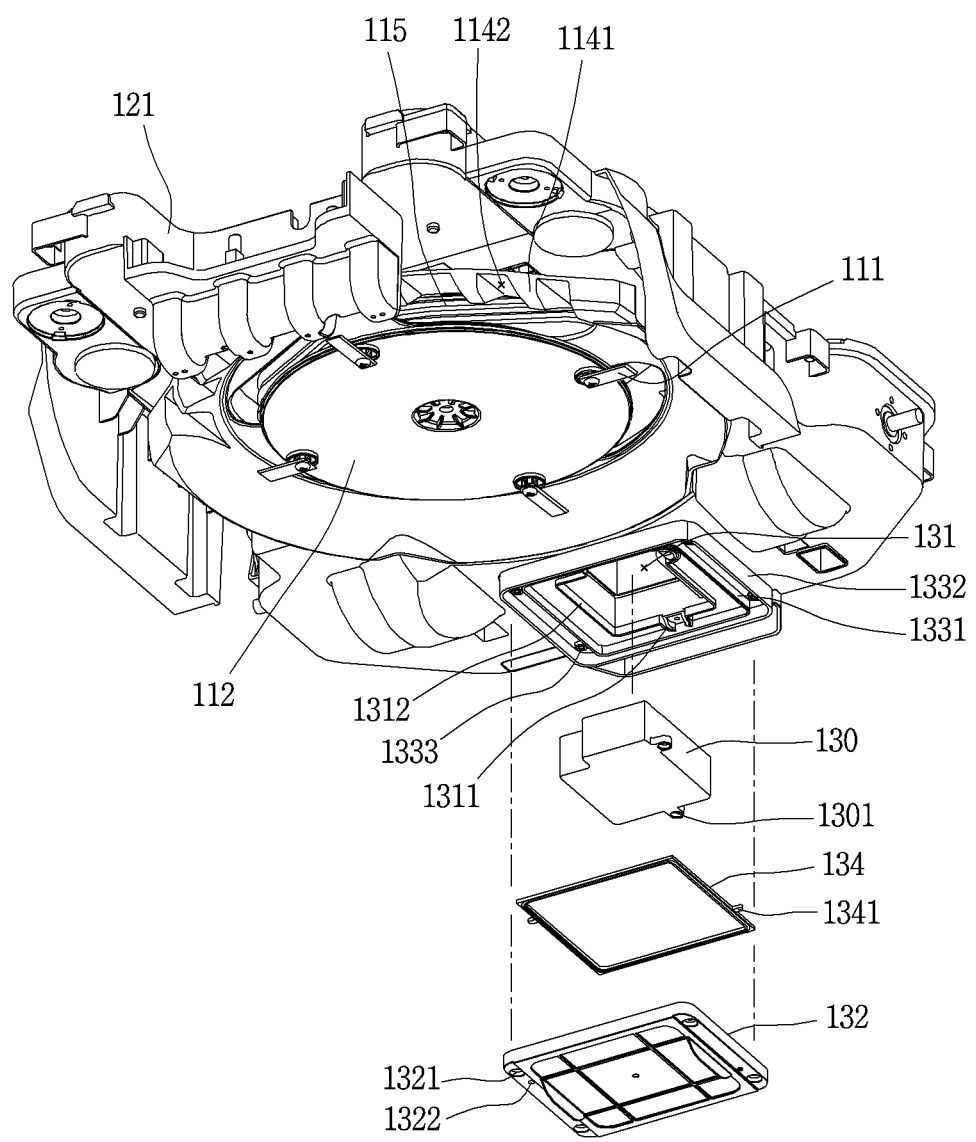
FIG. 7 is a conceptual view showing a state in which a battery is disassembled prior to mounting a battery on a bottom surface of an inner body unit in FIG. 3.

FIG. 7 is a conceptual view showing a state in which a battery 130 is disassembled prior to mounting a battery on a bottom surface of the inner body unit 121 in FIG. 3. The battery 130 may be a rechargeable secondary battery, and configured to supply power to an electric device such as a motor. The battery 130 may be mounted on a bottom surface of the inner body 121.

The inner body 120 has a battery receiving portion (or battery receiving recess) 131 to mount the battery 130 therein. The battery receiving portion 131 may be extended in a protruding manner upward from a bottom surface of the inner body 121 toward an inner space of the inner body 120.

The battery receiving portion 131 may be formed to have a rectangular box structure to correspond to the size and shape of the battery 130. The battery receiving portion 131 may be formed in a structure in which an upper surface, front, rear, left and right side surfaces are blocked, and configured to enclose the battery 130. A through hole may be formed at an upper end portion of the battery receiving portion 131, and a power terminal 1302 of the battery 130 may be protruded through the through hole to supply power to an electrical part disposed inside the inner body 120.

A plurality of first fastening portions (or first fastening extensions) 1301 may be protrude in a lateral direction from a lower edge of the battery 130. A plurality of second fastening portions (or second fastening extensions) 1311 may be formed on a bottom surface of the battery receiving portion 131 to correspond to a plurality of first fastening portions 1301.

A fastening hole may be formed in a penetrating manner in the first fastening portion 1301 and a fastening groove may be formed in the second fastening portion 1311. A fastening member (or fastener) such as a screw or the like may be fastened to the second fastening portion 1311 through the first fastening portion 1301 to fasten the battery 130 to the inner body 120.

A protruding rib 1312 may be protruded downward along an edge of the battery 130 at a lower end of the battery receiving portion 131 to enclose a lower end portion of the battery 130. The second fastening portion 1311 may be protruded in a rounded manner from one side of the protruding rib 1312 to enclose the first fastening portion 1301.

The battery cover 132 may be mounted on a bottom surface of the inner body unit 121 to cover the battery receiving portion 131. The battery cover 132 may be configured in a rectangular shape. A plurality of fastening holes 1321 may be formed at four corners of the battery cover 132.

A double sealing rib may be formed downward in a protruding manner on a bottom surface of the inner body unit 121. The double sealing rib may be disposed lower than a lower end of the battery 130. The double sealing rib may include a first sealing rib 1331 and a second sealing rib 1332. The first sealing rib 1331 may be formed in a rectangular shape with an area larger than that of a lower end portion of the battery 130. The second sealing rib 1332 may be formed to have a rectangular shape with an area larger than that of the first sealing rib 1331.

A protrusion receiving groove may be formed between the first sealing rib 1331 and the second sealing rib 1332. A plurality of boss portions (or bosses) 1333 may be formed in the protrusion receiving grooves. A fastening groove may be formed inside the plurality of boss portions 1333, respectively. Fastening member (or fastener) such as screws or the like may be fastened to the boss portions 1333, respectively, inside the protrusion receiving groove through the fastening holes 1321 of the battery cover 132 to fasten the battery cover 132 to the inner body 120.

A lower end of the second sealing rib 1332 may be extended downward to be larger than that of the first sealing rib 1331. A bottom surface of the battery cover 132 is brought into contact with a lower end of the first sealing rib 1331 by a step between the first sealing rib 1331 and the second sealing rib 1332, and a sealing protrusion 1323 protruded upward along an edge from the bottom surface of the battery cover 132 may be inserted into the protrusion receiving groove. A bottom surface of the battery cover 132 may be accommodated into the second sealing rib 1332.

A battery sealer 134 may be mounted on an inner surface of the battery cover 132. The battery sealer 134 may be made of a rubber material. The battery sealer 134 may be formed in a rectangular shape with an area larger than that of the battery 130. The battery 130 may be accommodated into the battery sealer 134 when viewed from a bottom surface of the battery cover 132 toward the battery 130 in an upward direction.

A plurality of sealer fastening portions 1341 may be formed on both sides in a longitudinal direction of the battery sealer 134 so as to protrude outwardly in a ring shape. A plurality of sealer fastening holes 1322 may be formed through the battery cover 132. Fastening members (or fasteners) such as screws or the like may be fastened to the plurality of seal fastening portions 1341 and the plurality of seal fastening holes 1322, respectively, to fasten the battery sealer 134 and the battery cover 132.

The battery sealer 134 may be disposed in close contact with a lower end of the first sealing rib 1331. According to such a configuration, the battery receiving portion 131 may be formed to be open downward, and thus the battery 130 may be assembled to be accommodated in the battery receiving portion 131 in an upward direction from a bottom surface of the inner body unit 121. Furthermore, the battery receiving portion 131 is formed integrally with the inner body unit 121, and formed to correspond to the shape of the battery 130 so as to enclose the battery 130, and thus an additional battery case is not required.

Moreover, the battery 130 is inserted into the battery receiving portion 131 through the battery receiving portion 131 on a bottom surface of the inner body 120 and then a first fastening portion 1301 formed on a bottom surface of the battery 130 is directly fastened to a second fastening portion 1311 formed on a bottom surface of the battery receiving portion 131 of the inner body 120, thereby facilitating assembly and simplifying maintenance such as the replacement of the battery 130.

In addition, a number of parts such as a battery case may be decreased to reduce the cost, and a size of the battery receiving portion 131 in the inner body 120 may be reduced as much as the space in which the battery case is removed, thereby providing a large inner space of the inner body 120.

Moreover, the battery sealer 134 may be disposed between the battery cover 132 and the first sealing rib 1331 of the inner body 120 to maintain airtightness between the battery cover 132 and the inner body 120.

Furthermore, the first sealing rib 1331, the sealing protrusion 1323 and the second sealing rib 1332 are arranged to overlap with each other in front-rear and left-right directions, thereby improving sealing performance, and preventing water from infiltrating into the battery receiving portion 131. Moreover, the fastening groove 1251 of the boss portion 1233 for fastening the battery cover 132 and the inner body 120 may be disposed outside the battery sealer 134, thereby preventing the infiltration of water generated due to a fine gap.

Figure 8:
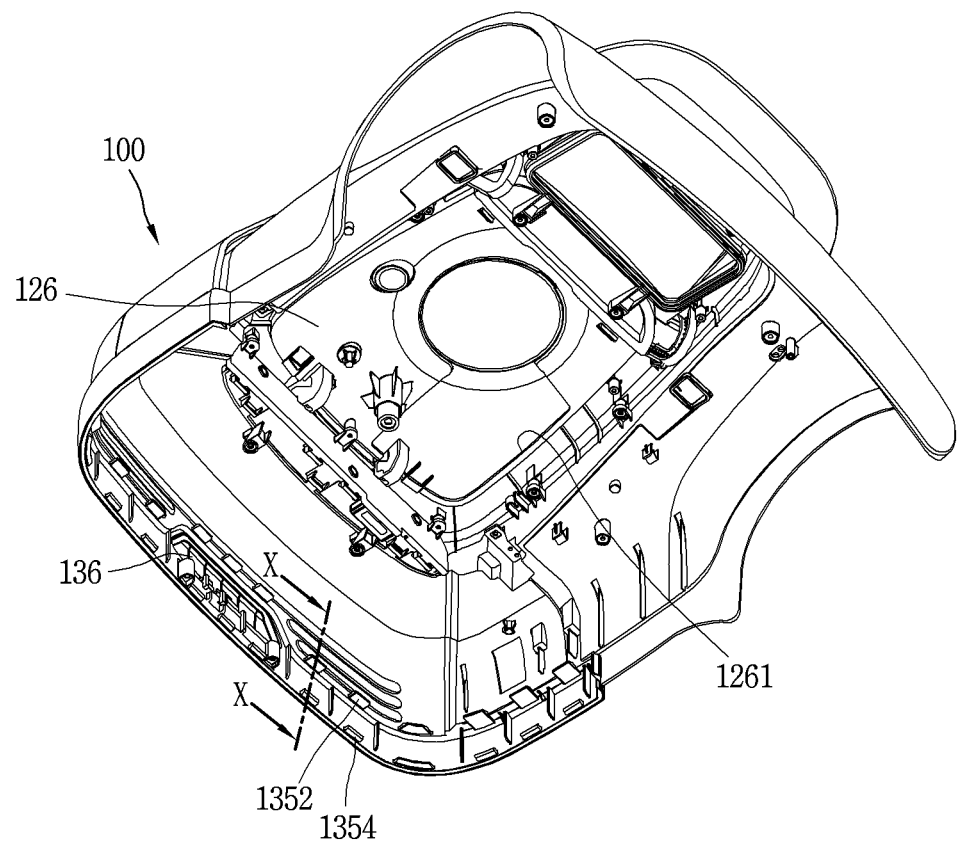
FIG. 8 is a conceptual view showing a fastening hook of a bumper portion fastened to a front side of the outer cover when an inner side of the outer cover is viewed from below in FIG. 1.
Figure 9:
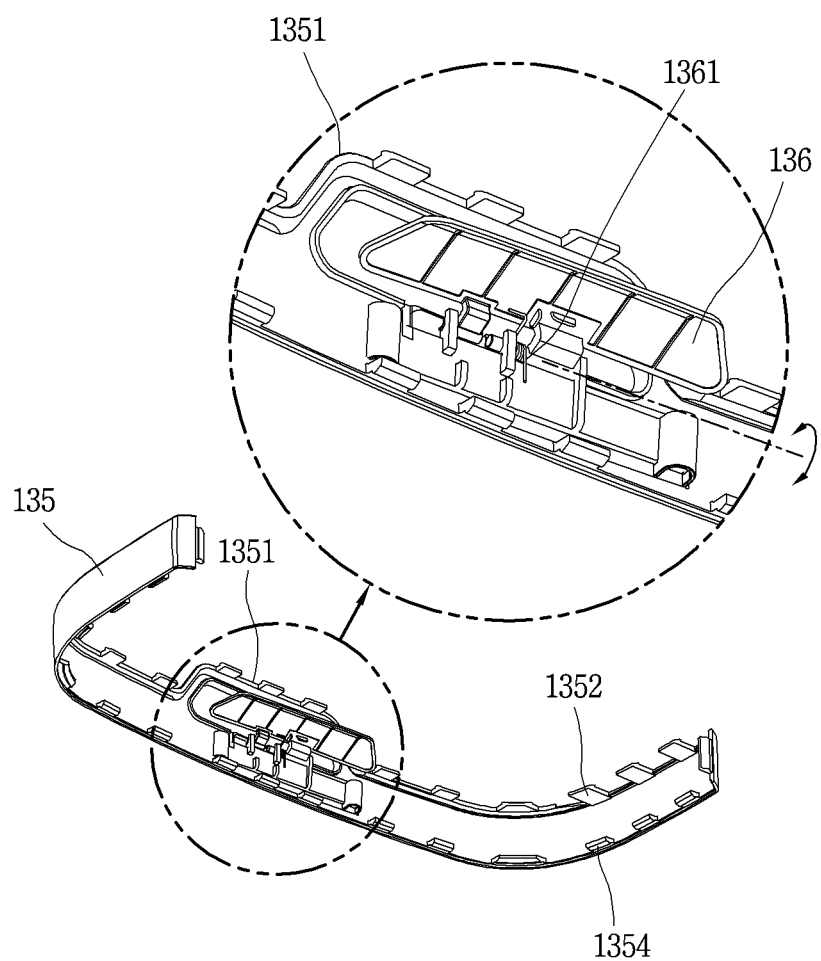
FIG. 9 is a conceptual view showing a state in which a charging cover is rotatably mounted on the outer cover in FIG. 8.
Figure 10:
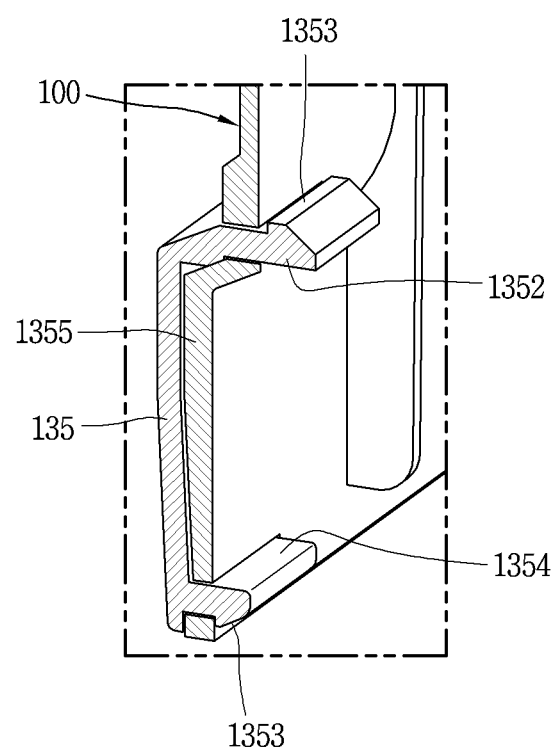
FIG. 10 is a cross-sectional view taken along line X-X in FIG. 8.

FIG. 8 is a conceptual view showing a fastening hook of a bumper portion (or bumper) 135 fastened to a front side of the outer cover 100 when an inner side of the outer cover 100 is viewed from below in FIG. 1, and FIG. 9 is a conceptual view showing a state in which a charging cover 136 is rotatably mounted on the outer cover 100 in FIG. 8, and FIG. 10 is a cross-sectional view taken along line X-X in FIG. 8.

The bumper portion 135 may be mounted on a front lower end of the outer cover 100. EPDM (ethylene propylene diene monomer) may be used as a rubber material of the bumper portion 135. EPDM, as an amorphous polymer material in which ethylene and propylene are copolymerized, is a synthetic rubber with excellent weather resistance, heat resistance, ozone resistance and solvent resistance, and the like. According to such a configuration, the bumper portion 135 may be formed of an EPDM material, thereby minimizing the deformation of the rubber itself even when exposed outdoors for a long period of time.

The bumper portion 135 may be configured to cover at least part of the front and both left and right sides of the outer cover 100 to mitigate an impact when the outer cover 100 collides with an obstacle. A charging hole may be formed in front of the outer cover 100. The charging hole may be configured to accommodate a charging terminal portion (or charging terminal protrusion) of a charging stand therein.

The charging cover 136 may be coupled to a front surface of the outer cover 100 with a hinge to cover the charging hole, and configured to be rotatable in a front-rear direction. The hinge is coupled to a lower portion of the charging cover 136, and an upper portion of the charging cover 136 may be rotated in a front-rear direction.

The bumper portion 135 may further include a charging hole enclosure portion 1351 to enclose the charging hole. The charging hole enclosure portion 1351 is extended in a protruding manner upward in a central portion of the bumper portion 135, and configured to enclose an edge of the filling hole. The charging hole enclosure portion 1351 may be formed to correspond to the shape of the charging hole.

According to such a configuration, the charging hole enclosure portion 1351 may not only alleviate an impact around the charging hole of the outer cover 100 when the outer cover 100 collides with an obstacle, but also minimize an impact from being transferred from the outer cover 100 to the charging terminal mounted on the inner body 120.

A plurality of fastening hooks 1352, 1354 may be formed on upper and lower portions of the bumper portion 135, respectively. The plurality of fastening hooks 1352, 1354 may be spaced apart along a length direction of the bumper portion 135. The plurality of fastening hooks 1352, 1354 may be spaced apart in a vertical direction of the bumper portion 135.

The plurality of fastening hooks 1352, 1354 may be horizontally extended rearward from the bumper portion 135, and a wedge portion 1353 may be protruded in a vertical direction at the rear end portion of the fastening hooks 1352, 1354. The first fastening hook 1352 located at an upper end portion of the bumper portion 135 of the plurality of fastening hooks 1352, 1354 may be formed such that a thickness of the first fastening hook 1352 decreases as the wedge portion 1353 moves upward.

The second fastening hook 1354 located at a lower end portion of the bumper portion 135 of the plurality of fastening hooks 1352, 1354 may be formed such that a thickness of the second fastening hook 1352 decreases as the wedge portion 1353 moves downward. A bumper mounting portion 1355 may be formed to protrude from front and both left and right sides of the outer cover 100. The bumper mounting portion 1355 may be extended along a horizontal length direction with a predetermined width (a length in a vertical direction) in the outer cover 100.

A plurality of hook inserting portions 1356 may be formed in a penetrating manner at upper and lower portions of the bumper mounting portion 1355 of the outer cover 100, respectively, in a thickness direction. The plurality of fastening hooks 1352, 1354 may fasten the outer cover 100 and the bumper portion 135 by engaging the wedge portion 1353 with an inner surface of the outer cover 100 through the plurality of hook inserting portions 1356, respectively. According to such a configuration, it may be possible to prevent the bumper portion 135 from being detached from the outer cover 100, and to minimize the bumper 135 from being lifted or deformed even when collisions between the outer cover 100 and obstacles are repeated.

Figure 11:
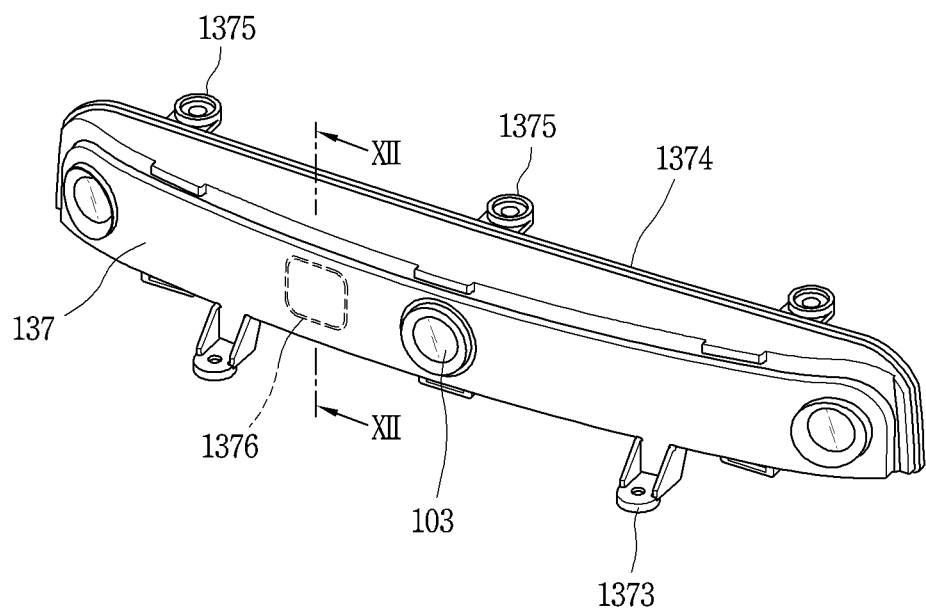
FIG. 11 is a conceptual view showing an ultrasonic sensor module mounted on the outer cover in FIG. 1.
Figure 12:
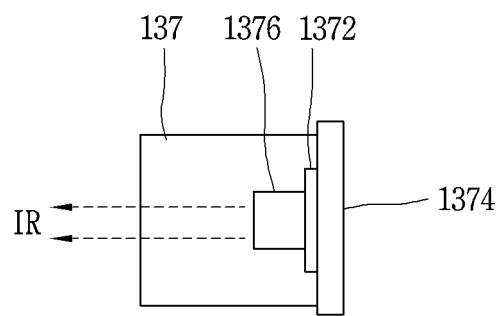
FIG. 12 is a conceptual view showing a state in which an infrared signal is irradiated toward a front side of the outer cover on a cross section taken along line XII-XII in FIG. 11.

FIG. 11 is a conceptual view showing an ultrasonic sensor module 103 mounted on the outer cover 100 in FIG. 1, and FIG. 12 is a conceptual view showing a state in which an infrared signal is irradiated toward a front side of the outer cover 100 in an infrared sensor 1376 on a cross section taken along line XII-XII in FIG. 11.

A plurality of ultrasonic sensor modules 103 may be configured to be mounted on a front upper portion of the inner body cover 122. The plurality of ultrasonic sensor modules 103 may be fabricated in a single module.

To this end, a ultrasonic sensor frame 137 may include a plurality of ultrasonic sensor mounting portions therein, and may be configured to mount a plurality of the ultrasonic sensor modules 103 therein. The ultrasonic sensor frame 137 may be extended in a left-right direction of the inner body 120.

The ultrasonic sensor frame 137 may include a frame body 1371 and a rear cover 1374. The frame body 1371 may have a receiving space therein and may be extended in a left-right direction of the inner body 120. A front surface of the frame body 1371 may be formed with a curved surface having a constant curvature, and upper and the lower surfaces of the frame body 1371 may be formed to have a narrower width from the center to the left and right end portions.

A rear end portion of the frame body 1371 may be configured to be open in a rearward direction. The rear cover 1374 may be mounted to cover a rear end portion of the frame body 1371. An ultrasonic sensor circuit board 1372 for controlling the operation of the ultrasonic sensor may be mounted on the rear cover 1374.

A plurality of fastening portions 1375 may be extended rearward to protrude from the rear cover 1374, and a plurality of fastening portions 1373 may be protruded at a lower portion of the frame body 1371. The plurality of fastening portions 1373, 1375 may be spaced apart from each other in a horizontal length direction of the rear cover 1374 or the frame body 1371.

Fastening holes may be formed in the plurality of fastening portions 1373, 1375, and fastening members such as screws or the like may be fastened to the outer cover 100 through the fastening holes of the frame body 1371 or the rear cover 1374, thereby fastening the ultrasonic sensor frame 137 and the outer cover 100.

An infrared (IR) sensor 1376 may be provided inside the ultrasonic sensor frame 137. The infrared sensor may be mounted on one side of the ultrasonic sensor circuit board 1372. The infrared sensor 1376 may be configured to sense the position of a charging stand. The infrared sensor 1376 may transmit an infrared signal and then receive a reflection signal reflected from the charging stand to sense the position of the charging stand.

The ultrasonic sensor frame 137 may be entirely made of a transparent material. For example, the ultrasonic sensor frame 137 may be made of transparent PC (POLYCARBONATE). According to such a configuration, an infrared signal transmitted from the infrared sensor 1376 may be irradiated on a front side of the outer cover 100 through the transparent PC of the ultrasonic sensor frame 137.

Furthermore, since the entire ultrasonic sensor frame 127 is made of a transparent material, there is no need for an additional transparent window and it is not necessary to assemble the transparent window integrally with the ultrasonic sensor frame 137, thereby reducing the manufacturing cost of the transparent window, and simplifying the assembling process.

Figure 13:
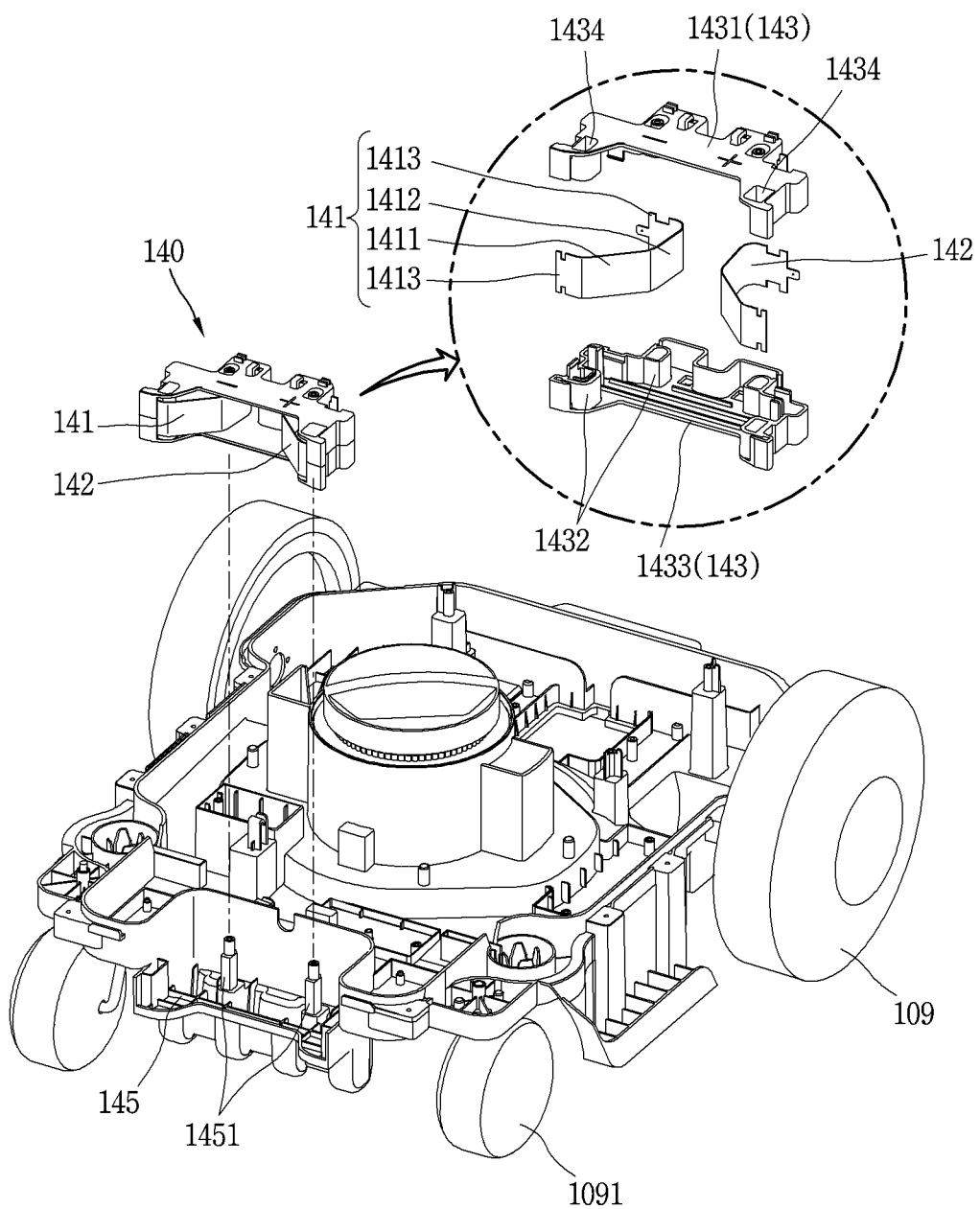
FIG. 13 is a conceptual view showing a state in which a charging terminal assembly is disassembled from the inner body unit in FIG. 6.

FIG. 13 is a conceptual view showing a state in which a charging terminal assembly is disassembled from the inner body unit 121 in FIG. 6. The charging terminal assembly 140 includes a plurality of charging terminals 141, 142 and a charging terminal holder (or charging terminal housing) 143.

The plurality of charging terminals 141, 142 may include a first charging terminal 141 and a second charging terminal 142 spaced apart to face each other in a left-right direction. Each of the first and second charging terminals 141, 142 may include a forward inclined surface portion 1411, a rear vertical surface portion 1412, and a coupling portion 1413.

The forward inclined surface portion 1411 may be extended in an inclined manner in a left or right direction as it goes rearward from a front end of the charging terminal. The front inclined surface of the first charging terminal 141 may be extended in an inclined manner in a right direction, and the front inclined surface of the second charging terminal 142 may be extended in an inclined manner in a left direction. The rear vertical surface portion 1412 may be extended in a front-rear direction.

The coupling portion 1413 is formed at a front end portion of the forward inclined surface portion 1411 and a rear end portion of the rear vertical surface portion 1412, and configured to be coupled to the charging terminal holder 143, which will be described later. According to such a configuration, the forward inclined surface portions 1411 on the first charging terminal 141 and the second charging terminal 142 may face each other in a left-right direction, and a gap between the first and second charging terminals 141, 142 may increase from a front end thereof to a rear side thereof, thereby allowing the charging terminal portion to smoothly enter, and allowing the charging terminal portion of the charging stand to be stably brought into contact with the charging terminal of the lawn mower robot.

The charging terminal holder 143 may include a first holder portion (or first housing) 1431 and a second holder portion (or second housing) 1433. The first holder portion 1431 and the second holder portion 1433 may be coupled to face each other in a vertical direction. The first holder portion 1431 and the second holder portion 1433 may be formed to correspond to each other.

A plurality of boss portions (or bosses) 1432, 1434 may be formed inside the first holder portion 1431 and the second holder portion 1433, respectively, to fasten the first holder portion 1431 and the second holder portion 1433. A plurality of first boss portions (or first bosses) 1432 may be arranged inside the first holder portion 1431 so as to be spaced apart from each other in front-rear and left-right directions, and each of the plurality of first boss portions 1432 may be protruded in an upward direction from a bottom surface the first holder portion 1431.

A plurality of second boss portions (or second bosses) 1434 may be protruded at positions corresponding to the first boss portions 1432 inside the second holder portion 1433. The first boss portion 1432 and the second boss portion 1434 may each extend in a pipe shape in a vertical direction. The first boss portion 1432 and the second boss portion 1434 may be formed to have the same diameter, and coupled to each other in a vertical direction.

A charging terminal receiving portion 145 may be formed in a recessed manner on a front side of the inner body unit 121. The charging terminal receiving portion 145 may be configured in a rectangular box shape to accommodate the charging terminal holder 143.

The charging terminal receiving portion 145 has a plurality of coupling protrusions 1451 to be coupled to the charging terminal holder 143. The plurality of coupling protrusions 1451 may be protruded in an upward direction from a bottom surface of the charging terminal receiving portion 145 at a position corresponding to the first boss portion 1432 to have smaller diameter than that of the first boss portion 1432.

The plurality of coupling protrusions 1451 are may be inserted into and coupled to the first boss portion 1432 to fasten the charging terminal holder 143 to the charging terminal receiving portion 145. A wire connecting hole 1452 may be formed on a rear upper surface portion of the charging terminal receiving portion 145. A wire may be connected to the charging terminal through the wire connecting hole 1452. A connecting lid 1453 with a rubber material may be inserted into the wire connecting hole 1452.

The wire connecting hole 1452 and the connecting lid 1453 may be formed to correspond to each other, and thus the connecting lid 1453 may be fitted and coupled to the wire connecting hole 1452. The connecting lid 1453 may be formed with a cutout portion extended in a vertical direction in the middle, and thus the wire may be passed and fixed through the cutout portion.

The charging cover 136 mounted on a front side of the outer cover 100 may be disposed in front of the charging terminal. An upper end portion of the charging cover 136 may be rotated rearward toward an inside of the rear cover 100 toward the charging terminal to open the charging cover 136. A coil spring 1361 may be installed on a hinge of the charging cover 136.

One end portion of the coil spring 1361 may be fixed to the charging cover 136, and the other end portion of the coil spring 1361 may be fixed to the outer cover 100. According to such a configuration, the charging terminal may be open by pushing the charging cover 136 in such a manner that that the charging cover 136 is rotated to an inside of the outer cover 100.

Furthermore, when the charging cover 136 is retracted from the charging terminal to release a pressing force applied to the charging cover 136, the charging cover 136 may be returned to its original position by an elastic force of the coil spring 1361. Moreover, when the charging terminal enters, the charging cover 136 may be open such that the charging terminal is inserted between the first charging terminal 141 and the second charging terminal 142, and brought into contact with either one of the first and second charging terminals 142 to perform charging.

Aspects of the present disclosure provide a lawn mower robot in which an existing coil sensor is changed to a circuit board (PCB) type and the changed PCB type is directly fastened to an inner body thereof, thereby facilitating assembly. Furthermore, another aspect of the present disclosure provides a lawn mower robot in which an existing IR transparent window is removed and a transparent material is applied to a material of an ultrasonic sensor frame, thereby eliminating the need for an additional IR transparent window.

In addition, still another aspect of the present disclosure provides a lawn mower robot in which a plurality of hooks is applied to upper and lower portions of a bumper, thereby preventing the lifting phenomenon and deformation of the bumper. Moreover, another aspect of the present disclosure provides a lawn mower robot in which an existing battery case is removed and a battery is directly fastened to the robot main body, thereby reducing the number of parts and cost.

Related to the foregoing aspects, a lawn mower robot according to an embodiment of the present disclosure may include an outer cover; an inner body accommodated into the outer cover to mount a plurality of wheels for traveling on both sides thereof; a plurality of wheel drive motors mounted on both sides of the inner body, respectively, to drive the plurality of wheels, respectively; a rotating plate rotatably mounted on a bottom surface of the inner body; a plurality of blades rotatably mounted on the rotating plate to mow the grass; a blade drive motor mounted inside the inner body to rotate a plurality of blades together with the rotating plate; a battery mounted inside the inner body to supply power to the wheel drive motor and the blade drive motor; a battery receiving portion extended upward in a protruding manner from a bottom surface of the inner body toward an inner space of the inner body to accommodate the battery therein at the bottom surface of the inner body; and a battery cover mounted to cover a lower portion of the battery receiving portion.

According to an example associated with the present disclosure, a plurality of first fastening portions may be protruded from a lower edge of the battery, and a plurality of second fastening portions may be protruded from a bottom surface of the battery receiving portion, and the plurality of first fastening portions and the plurality of second fastening portions may be arranged to face each other in a vertical direction, and fastened to each other by fastening members.

According to an example associated with the present disclosure, the battery receiving portion may have a protruding rib formed to enclose a lower end portion of the battery, and the plurality of second fastening portions may be arranged on the protruding rib and formed in a rounded manner to enclose the first fastening portions.

According to an example associated with the present disclosure, the lawn mower robot may further include a first sealing rib protruded downward in a rectangular box shape from a bottom surface of the inner body; a second sealing rib protruded downward in a rectangular box shape having a size larger than that of the first sealing rib from a bottom surface of the inner body; a plurality of boss portions provided with fastening grooves therein, and protruded between the first sealing rib and the second sealing rib; a sealing protrusion protruded upward along an edge of the battery cover, and inserted between the first sealing rib and the second sealing rib; a plurality of fastening holes formed through an outer edge portion of the battery cover; and fastening members fastened to the plurality of boss portions, respectively, through the plurality of fastening holes.

According to an example associated with the present disclosure, the lawn mower robot may further include a plurality of ultrasonic sensor modules mounted on a front upper portion of the outer cover to sense obstacles, wherein the plurality of ultrasonic sensor modules are mounted inside an ultrasonic sensor frame, and the ultrasonic sensor frame is mounted with an infrared sensor therein for transmitting infrared rays toward a front side of the outer cover to sense the position of a charging stand, and the ultrasonic sensor frame is formed of a transparent material to transmit the infrared rays therethrough.

According to an example associated with the present disclosure, the lawn mower robot may include a plurality of coil sensors configured to sense a wire installed within a preset lawn mower working area; and a plurality of coil sensor circuit boards mounted with the plurality of coil sensors, respectively, and mounted on a front inside of the inner body.

According to an example associated with the present disclosure, the lawn mower robot may further include an external input terminal port mounted on a front inside of the inner body to update software; an opening portion formed on a front upper side of the inner body to open the external input terminal port; and an external input terminal port cover mounted on a front upper side of the inner body to cover the opening portion.

According to an example associated with the present disclosure, the lawn mower robot may further include a height adjusting knob rotatably mounted on an upper side of the inner body to adjust the height of the plurality of blades, wherein the external input terminal port and the height adjusting knob are disposed close to each other in a length direction of the inner body.

According to an example associated with the present disclosure, the lawn mower robot may further include an upper cover having a front end portion coupled to an upper portion of the outer cover with a hinge and a rear end portion rotatably mounted in a vertical direction; an inner cover (126) spaced apart from a lower portion of the upper cover, and installed at an upper inner side of the outer cover; and an opening portion formed to be open on a front side of the inner cover (126) to expose the external input terminal port to an upper portion of the inner cover (126) when the upper cover is open.

According to an example associated with the present disclosure, the lawn mower robot may further include a bumper portion mounted to enclose a front portion of the outer cover and part of both left and right sides thereof; a plurality of fastening hooks extended rearward from upper and lower ends of the bumper portion, respectively; and a wedge portion protruded in a vertical direction to face the plurality of fastening hooks, respectively. According to an example associated with the present disclosure, the plurality of fastening hooks may be spaced apart from each other in a length direction of the bumper portion.

According to an example associated with the present disclosure, the lawn mower robot may further include a charging hole formed in a penetrating manner on a front side of the outer cover to accommodate a charging terminal portion protruded from a charging stand; and a charging cover coupled to a front surface of the outer cover with a hinge to cover the charging hole.

According to an example associated with the present disclosure, the lawn mower robot may further include a coil spring installed on a hinge of the charging cover to return the charging cover to its original position as a pressing force is released from the charging cover.

According to an example associated with the present disclosure, the lawn mower robot may further include a plurality of charging terminals spaced apart rearward from the charging cover to be brought into contact with the charging terminal portion; and a charging terminal holder configured to accommodate the plurality of charging terminals therein, and mount the plurality of charging terminals on a front inner side of the inner body, wherein the charging terminal holder includes a first holder portion that is open in a forward direction, and mounted on the inner body; and a second holder portion coupled to an upper portion of the first holder portion.

According to an example associated with the present disclosure, the lawn mower robot may further include a plurality of first boss portions protruded upward in a pipe shape from an inner bottom surface of the first holder portion; a second boss portion protruded downward in a pipe shape having a diameter larger than that of the first boss portion on an inner upper side of the second holder portion, and coupled to the first boss portion to be accommodated therein; and a plurality of coupling protrusions protruded upward from an inner bottom surface of the inner body to be inserted into the first boss portion.

Aspects of the lawn mower robot according to the present disclosure will be described as follows. First, a coil sensor in the related art may be changed to a PCB (Printed Circuit Board) type, and thus an additional coil sensor holder may not be required, thereby simplifying the structure of the coil sensor to easily mount the coil sensor into an inner body. Second, an infrared signal emitted from an infrared sensor may be irradiated on a front side of an outer cover through a transparent PC of an ultrasonic sensor frame.

Since an entire ultrasonic sensor frame is made of a transparent material, there is no need for an additional transparent window and it is not necessary to assemble the transparent window integrally with the ultrasonic sensor frame, thereby reducing the manufacturing cost of the transparent window, and simplifying the assembling process.

Third, a battery receiving portion is formed to be open downward, and thus a battery may be assembled to be accommodated in the battery receiving portion upward from a bottom surface of an inner body unit. Furthermore, the battery receiving portion may be formed integrally with the inner body unit, and configured to correspond to a shape of the battery so as to enclose the battery, and thus an additional battery case may not be required.

Moreover, the battery may be inserted into the battery receiving portion through the battery receiving portion on a bottom surface of the inner body and then a fastening portion formed on a bottom surface of the battery may be directly fastened to a boss portion formed on the bottom surface of the inner body, thereby facilitating assembly and simplifying maintenance such as battery replacement.

In addition, a number of parts such as a battery case may be decreased to reduce the cost, and a size of the battery receiving portion in the inner body may be reduced as much as the space in which the battery case is removed, thereby providing a large inner space of the inner body. Fourth, when a user opens a first upper cover to update software, an inner cover may be disposed at an upper inner side of an outer cover, and an opening portion may be formed at a right front side of the inner cover, and an external input terminal may be connected to an external input terminal port exposed through the opening portion, thereby facilitating software updates, and continuously reflecting software improvements.

Furthermore, the external input terminal port may be disposed close to a blade height adjusting unit, and the external input terminal port and a height adjusting knob may be gathered in one place below the first upper cover, and the user may see the external input terminal port, the height adjusting knob, a blade height display window at a glance, thereby facilitating the height adjustment of the blade and maintenance such as software update.

Fifth, a plurality of fastening hooks may be extended rearward from upper and lower ends of a bumper portion, respectively, and a wedge portion may be protruded in a vertical direction to face a rear end of the fastening hook and fastened to an inner side of the outer cover, thereby preventing the bumper portion from being detached from the outer cover, and minimizing the bumper portion from being lifted or deformed even when collisions between the outer cover and obstacles are repeated.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lawn mower robot, comprising:
an outer cover;
an inner frame positioned in the outer cover;
a plurality of wheels provided on sides of the inner frame and configured to rotate to move the lawn mower robot;
one or more blades rotatably mounted at a lower surface of the inner frame and configured to rotate to mow grass;
at least one motor inside coupled to the inner frame to provide a force to rotate the wheels and the blades;
a battery positioned inside the inner frame to supply power to the at least one motor;
a battery receiving recess that extends upward from the lower surface of the inner frame and toward an inner space of the inner frame, the battery receiving recess being configured to accommodate the battery therein;
a battery cover configured to be coupled to the inner frame at a lower opening of the battery receiving recess;
a plurality of first fastening extensions protruding from a lower edge of the battery; and
a plurality of second fastening extensions protruding from a bottom region of the battery receiving recess, wherein the plurality of first fastening extensions and the plurality of second fastening extensions are configured to face each other in a vertical direction and to be coupled to each other by fasteners.

2. The lawn mower robot of claim 1, wherein the battery receiving recess has a protruding rib configured to enclose a lower end of the battery, and the plurality of second fastening extensions are positioned on the protruding rib and are formed in a rounded manner to enclose the first fastening extensions.

3. A lawn mower robot, comprising:
an outer cover;
an inner frame positioned in the outer cover;
a plurality of wheels provided on sides of the inner frame and configured to rotate to move the lawn mower robot;
one or more blades rotatably mounted at a lower surface of the inner frame and configured to rotate to mow grass;
at least one motor inside coupled to the inner frame to provide a force to rotate the wheels and the blades;
a battery positioned inside the inner frame to supply power to the at least one motor;
a battery receiving recess that extends upward from the lower surface of the inner frame and toward an inner space of the inner frame, the battery receiving recess being configured to accommodate the battery therein;
a battery cover configured to be coupled to the inner frame at a lower opening of the battery receiving recess;
a first sealing rib protruding downward in a rectangular box shape from the lower surface of the inner frame;
a second sealing rib protruding downward in a rectangular box shape and lateral spaced outward from the first sealing rib along the lower surface of the inner frame;
a plurality of bosses provided with fastening grooves therein, and protruded between the first sealing rib and the second sealing rib;
a sealing protrusion protruded upward along an edge of the battery cover, and inserted between the first sealing rib and the second sealing rib;
a plurality of fastening holes extending through an outer edge of the battery cover; and
fasteners configured to be coupled to the plurality of bosses, respectively, through the plurality of fastening holes.

4. The lawn mower robot of claim 1, further comprising:
a plurality of ultrasonic sensors provided at a front upper region of the outer cover to sense obstacles,
wherein the plurality of ultrasonic sensors are positioned inside an ultrasonic sensor frame; and
an infrared sensor provided on the ultrasonic sensor frame and configured to transmit infrared rays toward a front side of the outer cover to sense a position of a charging stand,
wherein a region of the ultrasonic sensor frame includes a transparent material to transmit the infrared rays therethrough.

5. The lawn mower robot of claim 1, further comprising:
a plurality of coil sensors configured to sense a wire installed within a preset lawn mower working area; and
a plurality of coil sensor circuit boards coupled to the plurality of coil sensors, respectively, and positioned at a front inside of the inner frame.

6. A lawn mower robot, comprising:
an outer cover;
an inner frame positioned in the outer cover;
a plurality of wheels provided on sides of the inner frame and configured to rotate to move the lawn mower robot;

one or more blades rotatably mounted at a lower surface of the inner frame and configured to rotate to mow grass;

at least one motor inside coupled to the inner frame to provide a force to rotate the wheels and the blades;

a battery positioned inside the inner frame to supply power to the at least one motor;

a battery receiving recess that extends upward from the lower surface of the inner frame and toward an inner space of the inner frame, the battery receiving recess being configured to accommodate the battery therein;

a battery cover configured to be coupled to the inner frame at a lower opening of the battery receiving recess;

an external input terminal port provided at a front inside of the inner frame;

an opening provided on a front upper side of the inner frame to provide access to the external input terminal port; and an external input terminal port cover configured to be positioned on a front upper side of the inner frame and over the opening to provide access to the external input terminal port.

7. The lawn mower robot of claim 6, further comprising:
a height adjusting knob rotatably mounted on an upper side of the inner frame and configured to adjust a height of the blades,
wherein the external input terminal port and the height adjusting knob are provided adjacent to each other in a length direction of the inner frame.

8. The lawn mower robot of claim 6, further comprising:
an upper cover having a front end hingedly coupled to an upper region of the outer cover, and a rear end rotatably mounted in a vertical direction;
an inner cover spaced apart from a lower region of the upper cover, and positioned at an upper inner surface of the outer cover; and
an opening provided at on a front side of the inner cover and configured to expose the external input terminal port to an upper portion of the inner cover when the upper cover is open.

9. The lawn mower robot of claim 1, further comprising:
a bumper positioned to enclose a front region and parts of left and right sides of the outer cover;
fastening hooks extended rearward from upper and lower ends of the bumper, respectively; and
a wedge protruded in a vertical direction to face the fastening hooks.

10. The lawn mower robot of claim 9, wherein the fastening hooks are spaced apart from each other in a length direction of the bumper portion.

11. A lawn mower robot, comprising:
an outer cover;
an inner frame positioned in the outer cover;
a plurality of wheels provided on sides of the inner frame and configured to rotate to move the lawn mower robot;
one or more blades rotatably mounted at a lower surface of the inner frame and configured to rotate to mow grass;
at least one motor inside coupled to the inner frame to provide a force to rotate the wheels and the blades;
a battery positioned inside the inner frame to supply power to the at least one motor;
a battery receiving recess that extends upward from the lower surface of the inner frame and toward an inner space of the inner frame, the battery receiving recess being configured to accommodate the battery therein;

a battery cover configured to be coupled to the inner frame at a lower opening of the battery receiving recess;

a charging hole provided at a front side of the outer cover and configured to receive a portion of a charging terminal protrusion of a charging stand; and a charging cover hingedly coupled to a front surface of the outer cover over the charging hole.

12. The lawn mower robot of claim 11, further comprising:
a spring installed on a hinge of the charging cover and configured to provide a force to return the charging cover to an original position when a pressing force is released from the charging cover.

13. The lawn mower robot of claim 11, further comprising:
a plurality of charging terminals spaced apart rearward from the charging cover and configured to be brought into contact with the charging terminal protrusion; and
a charging terminal housing configured to receive the plurality of charging terminals therein and to position the plurality of charging terminals on a front inner side of the inner frame,
wherein the charging terminal housing includes:
a first housing that is open in a forward direction, and mounted on the inner frame; and
a second housing coupled to an upper region of the first housing.

14. The lawn mower robot of claim 13, further comprising:
a plurality of first bosses protruding upward from an inner bottom surface of the first housing;
a second boss protruding downward and having a diameter larger than that of the bosses on an inner upper side of the second housing, and coupled to one of the first bosses to be accommodated therein; and
a plurality of coupling protrusions extending upward from an inner bottom surface of the inner frame and configured to be inserted into the first bosses.

15. The lawn mower robot of claim 1, further comprising:
a rotating plate rotatably positioned at the lower surface of the inner frame, wherein the one or more blades are rotatably mounted on the rotating plate, wherein the one or more motors rotate the rotating plate to rotate the one or more blades.

16. The lawn mower robot of claim 15, wherein the one or more motors include:
a blade drive motor configured to rotate the rotating plate; and
one or more wheel motors configured to rotate the wheels.

17. The lawn mower robot of claim 15, wherein the one or more wheel motors include a plurality of wheel motors provided at the sides of the inner fame to rotate the wheels.

18. A lawn mower robot, comprising:
an outer cover;
an inner frame positioned in the outer cover;
a plurality of wheels provided on sides of the inner frame and configured to rotate to move the lawn mower robot;
one or more blades rotatably mounted at a lower surface of the inner frame and configured to rotate to mow grass;
at least one motor coupled to the inner frame to provide a force to rotate the wheels and the blades;
a battery that is removably received through the lower surface of the inner frame to supply power to the at least one motor;

a charging hole provided at a front side of the outer cover and configured to receive a portion of a charging terminal protrusion of a charging stand; and a charging cover hingedly coupled to a front surface of the outer cover over the charging hole.

19. The lawn mower robot of claim 18, further comprising:

a plurality of charging terminals spaced apart rearward from a front opening of the charging hole and configured to be brought into contact with the charging terminal protrusion; and a charging terminal housing configured to receive the plurality of charging terminals therein and to position the plurality of charging terminals on a front inner side of the inner frame, wherein the charging terminal housing includes:
- a first housing that is open in a forward direction and mounted on the inner frame; and
- a second housing coupled to an upper region of the first housing.

20. The lawn mower robot of claim 18, further comprising:

a spring installed on a hinge of the charging cover and configured to provide a force to return the charging cover to an original position when a pressing force is released from the charging cover.

* * * * *